United States Patent [19]

Clough

[11] 4,157,339

[45] Jun. 5, 1979

[54] PHOSPHONAMIDIC CONDENSATION REACTION PRODUCT

[75] Inventor: Thomas J. Clough, Flossmoor, Ill.

[73] Assignee: Atlantic Richfield Company, Philadelphia, Pa.

[21] Appl. No.: 807,103

[22] Filed: Jun. 16, 1977

Related U.S. Application Data

[60] Continuation of Ser. No. 172,207, Aug. 16, 1971, abandoned, which is a division of Ser. No. 169,527, Aug. 5, 1971, Pat. No. 3,733,363, which is a division of Ser. No. 629,929, Apr. 11, 1967, Pat. No. 3,650,953.

[51] Int. Cl.$^2$ .............. C07F 9/22; C07F 9/26; C07F 9/36
[52] U.S. Cl. .................. 260/551 P; 252/49.9; 260/606.5 R; 260/606.5 P; 260/920; 260/926; 526/19; 526/22; 526/27; 526/193; 526/233; 526/290; 528/392
[58] Field of Search ............ 260/551P, 606.5 R; 526/19, 290

[56] References Cited

U.S. PATENT DOCUMENTS

| | | | |
|---|---|---|---|
| 2,852,550 | 9/1958 | Godfrey | 260/551 |
| 3,356,670 | 12/1967 | Rudner et al. | 260/94.9 B |
| 3,562,160 | 2/1971 | Ford et al. | 252/49.9 |

OTHER PUBLICATIONS

Jungermann et al., "J. Org. Chem.," vol. 27, pp. 606–610 (1962).

*Primary Examiner*—Winston A. Douglas
*Assistant Examiner*—John Doll
*Attorney, Agent, or Firm*—John B. Goodman

[57] ABSTRACT

A phosphorous halide (for example, PCl$_3$) is present during the Friedel-Crafts polymerization of an alpha-monoalkene, resulting in the in situ formation of a phosphorylated polymer. Further reaction of the polymer with a polyamine converts phosphoryl groups to phosphonamide groups, yielding a product which is useful as a lube oil detergent.

9 Claims, No Drawings

PHOSPHONAMIDIC CONDENSATION REACTION PRODUCT

This is a streamline continuation, of application Ser. No. 172,207, filed Aug. 16, 1971, now abandoned, which is a division of application Ser. No. 169,527, filed Aug. 5, 1971, now U.S. Pat. No. 3,733,363, which is a division of application Ser. No. 629,929, filed Apr. 11, 1967, now U.S. Pat. No. 3,650,953.

Today many passenger cars primarily are used for driving to and from work, for errands, and for other short trips. This type of driving requires many stops and does not provide for full warmup or utilization of the automobile. Engines are so lightly loaded and operated so intermittently that rarely do they get warm enough to operate efficiently. The fuel used in this type of engine is, of course, gasoline, usually known as an easily-burned fuel. Gasoline is easily burned if engine combustion chambers reach a high enough temperature and the fuel therein is properly vaporized and mixed with adequate oxygen. In such combustion, the gasoline is completely burned and only harmless carbon dioxide gas and steam are formed. However, if the engine does not operate long enough to heat its jacket water and crankcase to at least 150° F. some carbon dioxide and steam will blow by piston rings, condense in the cold crankcase and form liquid carbonic acid which rusts iron and steel.

When the engine is cold and operated at the low speeds characteristic of "short trip" driving, combustion is insufficient and incomplete. Under these conditions the gasoline is only partially burned, and much carbon, carbon monoxide gas, partially-oxidized fuel, and highly corrosive fuel acids are formed in the combustion chambers (in addition to the normal carbon dioxide gas and water) and blow by piston rings to foul the crankcase oil. The material resulting from incomplete combustion of gasoline causes numerous engine difficulties and sometimes expensive damage when collected in the crankcase. Examples of the damage that results, are seized and battered hydraulic valve lifters; worn cam lobes; struck piston rings; high piston ring and cylinder wear with consequent high oil consumption and oil contamination; corroded bearings; scuffed pistons; clogged oil pump screens which may lead to engine oil starvation; burned out bearings; and piston seizures. A modern lubricant must therefore prevent deposition of solid products on the surfaces of the engine which normally come in contact with the lubricant.

Another source of trouble from deposits in internal combustion engines is the additives which are conventionally incorporated in lubricants. Particularly, this is the case with metal-containing additives, for example, the organic, metal-containing salts which are incorporated in the oil to increase the detergency thereof. Whenever oil is burned in th engine (as occurs with the oil film present in the cylinder wall during the combustion stroke) any metal-containing additives present in the oil may form an ash which is partially deposited on the various surfaces of the combustion chambers, spark plugs and valves. Accordingly, it is an object of this invention to provide a lubricant composition which is compounded with metal- or mineral-free detergents.

Still the major donor of engine deposits is the incompletely combusted fuel, particularly the metal additives contained in the fuel. The ashless detergents of this invention provide for inhibition of sludge formation in the engine and, further, dispersing of the sludge when formed. For many years, the detergent additives which are successfully employed on a commercial scale were organic, metal-containing compounds such as calcium petroleum sulfonate, calcium cetyl phosphate, calcium octyl salicylate, calcium phenyl stearate or the potassium salt of the reaction product of phosphorous pentasulfide and polybutene. Various of these detergents act by reacting chemically with precursors to form harmless compounds. Others act to prevent flocculation or coagulation of solid particles in the oil and maintain the same in a state of suspension as finely divided particles. Still others not only perform this dispersant function but also effect the solubilization or emulsification of the sparingly-soluble monomers in the oil and thereby greatly reduce the rate of polymerization. In the latter case, such polymer materials as do form within the body of the oil are smaller in size and can be peptized or dispersed in the oil much more readily than is the case with the large polymeric particles which are formed on exposed engine surfaces or in droplets lying within the oil. Detergents capable of performing the dispersant function as well as the solubilization or emulsification, are preferably employed wherever possible, particularly in automotive engines to be operated under city driving conditions.

It has now been found that a normally liquid base oil soluble phosphorylated polymer composed primarily of a polymerized $\alpha$-monoalkene having from 3 to about 30 carbon atoms, preferably about 9 to 21, and often at least about 12 carbon atoms, prepared by the polymerization of such $\alpha$-monoalkene in the presence of a strong Friedel-Crafts catalyst and a complex of a Friedel-Crafts catalyst and a phosphorous halide, can be reacted with an organic amine to give a mineral oil soluble polymer product effective as an ashless dispersant. Phosphorylated polymer amine product, e.g. phosphonamides, are used herein to include derivatives of trivalent phosphorous, as well as pentavalent phosphorous, such as amides.

The $\alpha$-monoalkene, which term includes mixtures of such monoalkenes, can be polymerized with another dissimilar olefinically unsaturated copolymerizable monomer having from about 3 to 20 carbon atoms, more preferably from about 4 to 10 carbon atoms. The $\alpha$-monoalkene will be present in at least a major portion and such dissimilar monomer can be present in a minor portion, e.g. up to about 49 more percent, preferably in an amount varying from about 5 to 45 mole percent, and more preferably about 10 to 40 mole percent based upon the total monomer content. Accordingly, the $\alpha$-monoalkene will provide about 55 to 95 or even 100 mole percent, preferably about 60 to 85 mole percent of the monomers polymerized.

The $\alpha$-olefins, or $\alpha$-monoalkenes, of the present invention can be represented by the formula:

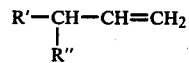

wherein R' and R" are selected from the group consisting of hydrogen and alkyl, including cycloalkyl, and the total number of carbon atoms in the $\alpha$-olefin is from 3 to about 30, preferably about 9 to 21. Preferably, one of R' and R" is hydrogen and the other is a straight chain alkyl to give a normal olefin. The choice of $\alpha$-olefin, their ratios, if more than one be employed, and the extent of reaction are such as to give an oil-soluble polymer, and often the total number of carbon atoms in the olefin reactant is at least about 12. The α-olefin can also contain minor amounts, preferably less than about 10 percent by weight, of other, non-polymerizable hydrocarbons such as saturated hydrocarbons and aromatics.

As noted above, the α-olefin may be copolymerized with another olefinically unsaturated monomer which is dissimilar to or different from the α-olefin. By dissimilar I mean falling outside the definition of the class of α-monoalkenes described herein. Examples of such other monomers include hydrocarbons, such as styrene, vinyl cyclohexene, vinyl toluene, indene, butadiene, etc., and other unsaturated materials as, for instance, linoleic acid, methyl oleate, methyl methacrylate, acrylonitrile, etc. The major requirement of said dissimilar monomer is that it be copolymerizable with the said α-olefin.

A complex of a Friedel-Crafts catalyst and a phosphorous halide is employed to initiate the polymerization of the essentially α-olefin monomer. The phosphorous halides used include compounds of the formulae $PX_3$, $PX_5$, $POX_3$, $POR'X_2$, $PR'X_2$ and $PR'X_4$ in which X is selected from the group consisting of chlorine, bromine and iodine, and R' is a monovalent hydrocarbon radical containing up to 16 carbon atoms. R', for example, can be alkyl, aryl, aralkyl, alkaryl, alkoxy, aroxy, alkaryloxy or cycloalkyl. Examples of such compounds include phosphorous trichloride, phosphorous pentachloride, phosphorous oxychloride, phenylphosphonous dichloride, ethylphosphonous dichloride, benzyl-phosphonous dichloride, xylyphosphonous dichloride, dodecylphosphonous dichloride, isopropylphosphonous dichloride, normal butylphosphonous dichloride, tertiary butylphosphonous dichloride, tertiary octylphosphonous dichloride, and the bromine and iodine analogues thereof. The preferred phosphorous halides are phosphorous trihalides, especially phosphorous trichloride and phosphorous tribromide. The molar ratio of polymerized olefinically-unsaturated monomer to phosphorous halide residue in the polymer may be about 1, or less, to 300:1, preferably about 1 to 50:1. Thus, the polymer may have about 1 to 300, preferably about 1 to 50, molar equivalents of olefinically unsaturated monomer per gram atom of phosphorous in the polymer.

The phosphorous halide, which is supplied in solution with the Friedel-Crafts catalyst, as will be more fully discussed hereinafter, performs a dual role, i.e., as initiator of the addition polymerization reaction and as phosphorylating agent of the olefin polymer thus formed.

The phosphorylated polymer, which is to be amidated to form the detergent of the present invention, can be prepared by subjecting the α-olefin and the dissimilar monomer, if used, to a polymerization temperature of about 0 to 50° C., preferably about 0 to 25° C., in the presence of a strong Friedel-Crafts catalyst such as aluminum chloride or boron trifluoride. In addition, it is contemplated that the polymerization can be performed under pressure (e.g., for example up to 500 psig.) at temperatures wherein the oil-soluble phosphorylated olefin polymer will be produced. With the catalyst is charged the phosphorous halide, such as phosphorous trichloride, in an amount sufficient for in situ formation of a phosphoryl halide derivative of the olefin polymer.

The polymerization of the α-monoalkene is performed in the presence of a strong Friedel-Crafts catalyst and phosphorous halide Friedel-Crafts catalyst complex. The polymerization is conducted in the presence of an additional co-catalyst such as a monochloroalkane, which also acts as a solvent for the Friedel-Crafts catalyst and complex. The monochloroalkane has 1 to 4 carbon atoms, ethyl chloride often being preferred. The strong Friedel-Crafts catalyst will generally be present in the catalyst solution in a concentration of about 0.5 to 15 percent, preferably about 2 to 7 percent, by weight, and the amount of the Friedel-Crafts catalyst employed is generally about 0.1 to 20 percent by weight, preferably about 2 to 15 percent by weight, of the monomer fed. The phosphorous halide will generally be present in the catalyst solution in a concentration of from about 0.002 to 0.1 mole per 100 ml. of catalyst solution. At all times, the phosphorous halide concentration should be less, on a molar basis, than the Friedel-Crafts catalyst concentration. Thus, the expression "strong Friedel-Crafts catalyst" and "Friedel-Crafts catalyst phosphorous halide complex" can be obtained by using the same Friedel-Crafts catalyst in excess of the phosphorous halide concentration. The volumetric ratio of catalyst solution of the olefinic reactants used is often about 0.5 to 5:1, preferably about 2 to 3:1. The polymerization is advantageously conducted using simultaneous and separate addition of the catalyst solution and α-olefin feed to the reaction vessel.

After the addition of catalyst, phosphorous halide and monomers has been completed, the reaction may be permitted to continue for a short period of time, generally about 5 to 45 minutes, to insure polymerization to a base oil-soluble polymer product, for instance, a normally liquid material which may have a kinematic viscosity at 210° F. of up to about 5000 centistokes, preferably up to about 600 centistokes. The reaction may be quenched using, for example, a lower alkanol, e.g. of 1 to 4 carbon atoms, such as methanol or ethanol. The resulting polymer can then be diluted with a hydrocarbon solvent, such as hexane, and washed with water, alcohol, dilute aqueous caustic soda, hydrochloric acid, etc.

The novel ashless detergent of the present invention may be prepared by the condensation reaction of the phosphorylated polymer of α-olefin with an essentially aliphatic polyamine. Suitable polyamines may be represented by the general formula:

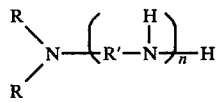

wherein R' is a divalent alkylene radical of 2 to 14 or more carbon atoms, preferably 2 to about 7 carbon atoms; R is selected from hydrogen and hydrocarbon radicals such as alkyl, including cycloalkyl, which may have, for instance, 1 to about 30 or more carbon atoms, preferably 1 to about 7 carbon atoms; n is a number from 1 to about 10, preferably about 2 to 6. R may extend between two N-atoms, for instance the two to which R' is attached, in which case these nitrogen atoms will have only one other bond for further attachment. The R and R' substituents are preferably saturated, but may be unsaturated, and may be substituted with non-deleterious substituents. Polymers from the reaction of alkylene dihalides with ammonia or from the polymerization of ethylene imine are often preferred. A 1,2-diamine, at least one amine of which is primary, is often preferred and may be represented by the following general formula:

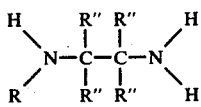

wherein R is selected from hydrogen and hydrocarbon radicals such as alkyl, as noted above, or is amino alkyl of 1 to about 30, preferably 1 to about 7, carbon atoms, and R" is selected from H and alkyl of 1 to about 12 or more carbon atoms, preferably 1 to about 5 carbon atoms. R may also be a hydroxy-alkyl, alkoxy-alkyl or aromatic radical.

Thus, useful polyamines include, for instance, monoalkylenediamines, dialkylaminoalkylamines, polyalkylenepolyamines, N-(β-aminoalkyl)piperazines, etc. Illustrative of suitable monoalkylenediamines are ethylenediamine, propylenediamine, butylenediamine, octylenediamine, etc. Examples of suitable dialkylaminoalkylamines are dimethylaminoethylamine, dimethylaminopropylamine, dimethylaminobutylamine, diethylaminopropylamine, diethylaminoamylamine, dipropylaminopropylamine, methylpropylaminoamylamine, propylbutylaminoethylamine, etc. Examples of polyalkylenepolyamines are diethylenetriamine, triethylenetetramine, tetraethylenepentamine, hexapropyleneheptamine, tetrabutylenepentamine, polyamine D (a mixture of aliphatic and cyclic polyethyleneamines boiling above 340° C. having an average molecular weight nearly the same as pentaethylenehexamine and having as principal components pentaethylenehexamine, symmetrical and unsymmetrical diaminoethyltriaminoethylamine, symmetrical diaminoethyltriethylenetetramine, symmetrical and unsymmetrical diaminoethyl, diaminoethylpiperazine, piperazinoethyltriethylenetetramine, 4-(N-piperazinoethyl)triethylenetetramine, bis-piperazinoethylamine, and aminoethyl(dipiperazinoethane), polyamine H (bottoms from manufacturing tetraethylenepentamine), etc. Suitable N-(β-aminoalkyl)piperazines include N-methyl-N'-(β-aminoethyl)piperazine, N-(β-aminoisopropyl)-piperazine, etc.

In the condensation reaction of the phosphorylated polymer with the polyamine to prepare the phosphonamide detergent of the invention, the polyamine is generally reacted in an amount sufficient to provide up to about 2 moles of polyamine and at least about 0.1 gram atom of hydrogen-bonded nitrogen, per gram atom of phosphorous in the polymer. By "hydrogen-bonded nitrogen" is meant nitrogen of a primary or secondary amine group of the polyamine, which nitrogen may or may not still be bonded to hydrogen after the polyamine is condensed with the phosphorylated polymer. Preferably, the amount of polyamine will be sufficient to provide at least about 1 gram atom of hydrogen-bonded nitrogen for each gram atom of phosphorous.

Thus, for instance, given a phosphorylated polymer having 4 gram atoms of phosphorous per mole of polymer, and assuming that tetraethylenepentamine (TEPA) is the polyamine to be condensed therewith, there would generally be reacted with 1 mole of the polymer about 0.08 to 8 moles of TEPA; preferably, however, at least about 0.8 mole of TEPA would be employed, thereby providing at least a 1:1 ratio of amino nitrogen to phosphorous atoms. The use of greater amounts of TEPA in this instance is unwarranted since essentially all of the 4 gram atoms of phosphorous in the polymer would necessarily be diamidated once 8 moles of polyamine are reacted therewith.

The phosphonamide-forming condensation reaction is usually conducted at a temperature of about 60° to 320° C., often about 80° to 150° C. The reaction is conducted to give a base oil-soluble product and often takes about 0.25 to 24 hours, preferably about 0.5 to 5 hours. Water, HCl or alcohol formed during the condensation reaction is preferably removed as formed.

Water is released during the condensation when the phosphoryl halide moiety has previously been essentially completely hydrolyzed as, for example, may occur when the phosphorylation reaction is quenched with water. Alcohol is released during the condensation when the phosphoryl halide moiety has previously been essentially completely alcoholyzed as, for example, may occur when the phosphorylation reaction is quenched with an alcohol. HCl is released during the condensation when, as is often preferred, one or more halide atoms have been allowed to remain in the phosphoryl halide moiety as, for example, may occur with only partial or no quenching of the phosphorylation reaction with water or alcohol.

The phosphonamidio polymer resulting from the condensation reaction is base oil-soluble and ordinarily has a kinematic viscosity at 210° F. of up to about 10,000, preferably up to about 1000 centistokes. The detergent additives are added to the lubricating oils in minor, effective amounts, usually in the range of about 0.1 to 10% or more, preferably about 0.25 to 7.5% by weight of the oil.

Lubricating oils can be used as the base oil or major component of the lubricating oil compositions of the present invention include a wide variety of oils of lubricating viscosity, such as naphthenic base, paraffinic base, and mixed base mineral lubricating oils; other hydrocarbon lubricants, e.g., lubricating oils derived from coal products; and synthetic oils, e.g., alkylene polymers (such as polymers of propylene, butylene, etc., and mixtures thereof), alkylene oxide-type polymers (e.g., alkylene oxide polymers prepared by polymerizing the alkylene oxide, e.g., propylene oxide, etc., in the presence of water or alcohols, e.g., ethylene alcohol), carboxylic acid esters (e.g., those which are prepared by esterifying such dicarboxylic acids as adipic acid, azelaic acid, suberic acid, sebacic acid, alkyl succinic acid, fumaric acid, maleic acid, etc. with alcohols, such as butyl alcohol, hexyl alcohol, 2-ethylhexyl alcohol, dodecyl alcohol, etc.). The synthetic oils to which the polymeric phosphonamides may be added include ester-based synthetic oils of lubricating viscosity which consist essentially of carbon, hydrogen and oxygen, e.g., di-2-ethylhexyl sebacate. The above base oils may be used individually or in combination, wherever miscible or wherever made so by the use of mutual solvents. Various of these lubricating materials have been described in the literature and generally their viscosity ranges from the light to heavy oils, e.g. about 50 SUS at 100° F. to 250 SUS at 210° F. and preferably about 30 to 150 SUS at 210° F.

Other materials normally incorporated in lubricating oils to impart special characteristics can be added to the composition of this invention. These include corrosion inhibitors, extreme pressure agents, anti-wear agents, etc. The amount of such additives included in the composition usually ranges from about 0.01 weight percent up to about 20 or more weight percent, and in general they can be employed in any amounts desired as long as the composition is not unduly deleteriously affected.

The following Examples are included to further illustrate the present invention.

EXAMPLE I

A mixture of normal α-olefins of the following approximate composition

| | | |
|---|---|---|
| 1% | $C_8$ | α-olefin |
| 22% | $C_9$ | α-olefin |
| 55% | $C_{10}$ | α-olefin |
| 21% | $C_{11}$ | α-olefin |
| 1% | $C_{12}$ | α-olefin | was added to a one liter flask equipped with a Dean Stark trap through one of two addition funnels which were provided on the flask. A Dry Ice trap was mounted on the Dean Stark trap to remove and condense from the polymerization system the volatile solvent, ethyl chloride, used in the polymerization. To the remaining funnel was charged an ethyl chloride catalyst solution containing 5.15 grams aluminum chloride and 0.01562 moles of phosphorous trichloride per each 100 ml. of solution at 12° C.

Both the olefin feed and the catalyst solution were introduced into the reaction flask simultaneously, the olefin mixture at a rate of 20.4 ml. per minute (0.1095 moles per minute $C_8$ to $C_{12}$ α-olefin), and the catalyst solution containing phosphorous trichloride at a rate of 40 ml. per minute (0.0155 moles per minute aluminum chloride, 0.00625 moles per minute phosphorous trichloride). The total time for the addition of olefin and catalyst solution was 12 minutes, and the polymerization mixture was stirred for an additional 14 minutes. The temperature during polymerization was 19° C., and a total of 335 ml. of ethyl chloride (70%) was trapped out of the polymerization system. Methanol (400 ml.) was added to quench the catalyst.

The polymer was diluted with hexane and washed with water. After topping of solvents, the polymer had a KV at 100° F. of 2591.0 cs., a KV at 210° F. of 159.3 cs., a phosphorous content of 0.779%, a chlorine content of 0.89%, a specific gravity of 0.8762, an iodine number of 15.8 and an oxygen content of 0.49%. The residual unsaturation, shown by the iodine number, indicated that the polymerization was terminated by the formation of a double bond with no addition of phosphorous trichloride at this position.

EXAMPLE II

To a 500 ml. reaction flask was added 100 grams of the phosphorylated polymer made in Example I and 7 grams of tetraethylene pentamine. The system was purged with nitrogen over a 10 minute period as the temperature was increased to 65° C. The temperature was then increased to 200° C. over a 15 minute period and was maintained for 30 minutes. A 15 cm. vacuum was then applied, while maintaining the temperature at 200° C., for an additional one hour and 30 minutes to facilitate the removal of volatiles. The vacuum was then lowered to 5 mm., and the product was allowed to reach room temperature under the reduced pressure. The polymer was washed with water and stripped of solvents.

The polymer had the following properties:

TABLE I

| % Phosphorous | 0.708 |
|---|---|
| % Nitrogen | 0.36 |
| % Chlorine | 0.06 |
| KV at 100° F. | 9344.0 cs. |
| KV at 210° F. | 383.87 cs. |
| Specific Gravity | 0.8721 |

Infrared analysis detected amide formation. Since the chlorine content was very small, it appeared that the polymer reacted entirely with the polyamine.

The polymer was tested as an ashless detergent in a 95 V.I. Mid-Continent neutral oil in the Low Temperature Detergency Bench Test described in U.S. Pat. No. 3,044,860.

The following results were obtained:

TABLE II

| | (Merit Rating 100 = Clean) |
|---|---|
| Base Oil | 22 |
| Base oil plus 2% additive | 77 |

The foregoing shows that the novel polymeric phosphonamides of this invention have utility as ashless detergents. Other modes of applying the principles of this invention may be employed as will be apparent to those skilled in the art.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A mineral oil-soluble phosphonamidic condensation reaction product of (A) a lubricating-oil soluble phosphorylated polymer having a kinematic viscosity at 210° F. of up to about 5,000 centistokes, said polymer being prepared by the polymerization of from about 55–100 mole percent of an α-monoalkene having from 3 to about 30 carbon atoms and up to about 49 mole percent of a dissimilar olefinically unsaturated copolymerizable monomer having from 3 to about 20 carbon atoms in the presence of a polymerization catalyzing amount of a catalyst solution comprising strong Friedel-Crafts catalyst and, a monochloroalkane solvent of 1 to 4 carbon atoms and a complex of a phosphorus halide and a Friedel-Crafts catalyst, and (b) a polyamine having the formula

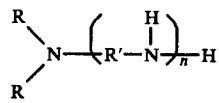

wherein R' is a divalent alkylene radical of 2 to about 14 carbon atoms, R is hydrogen or a hydrocarbon radical of 1 to about 30 carbon atoms and n is 1 to about 10, the amounts of (A) and (B) in said product being sufficient to provide from at least about 0.1 gram atom of hydrogen-bonded nitrogen, to about 2 moles of (B) per gram atom of phosphorus in (A), said condensation reaction product being soluble in a lubricating oil said polymerization and said reaction being conducted at a temperature, pressure and time sufficient to form said polymer and said reaction product.

2. The condensation reaction product of claim 1 wherein R' in the polyamine is a divalent alkylene radical of 2 to about 7 carbon atoms, R is hydrogen or an alkyl radical of 1 to about 7 carbon atoms and n is about 2 to 6.

3. The condensation reaction product of claim 1 wherein R' has 2 carbon atoms and R is hydrogen.

4. A lubricating oil-soluble phosphonamidic condensation reaction product of claim 1 wherein the phosphorylated polymer is formed in the presence of a phosphorus halide selected from the group consisting of compounds having the formulae:

$$PX_3, PX_5, POX_3, POR''X_2 \text{ and } PR''X_4$$

wherein X is chlorine, bromine or iodine, and R" is selected from alkyl, aryl, aralkyl, alkaryl, alkoxy, aroxy, alkaryloxy or cycloalkyl of about 1 to 16 carbon atoms.

5. The condensation reaction product of claim 4 wherein R" in the polyamine is a divalent alkylene radical of 2 to about 7 carbon atoms, R is hydrogen or an alkyl radical of 1 to about 7 carbon atoms and n is about 2 to 6.

6. The condensation reaction product of claim 4 wherein R" has 2 carbon atoms and R is hydrogen.

7. A lubricating oil-soluble phosphonamidic condensation reaction product of claim 1 wherein the α-monoalkene is polymerized in a reaction zone at a temperature of about 0 to 50° C. with a catalyst solution comprising about 0.5 to 15 percent, by weight of the solution, of a Friedel-Crafts catalyst, about 0.002 and 0.1 mole of a phosphorus halide, per each 100 ml. of the solution, and the balance of the solution being a monochloroalkane solvent of 1 to 4 carbon atoms.

8. The condensation reaction product of claim 3 wherein the Friedel-Crafts catalyst is aluminum chloride, the monochloralkane solvent is ethylchloride, the phosphorus halide is phosphoroustrichloride, R" in the polyamine is a divalent alkylene radical of 2 to about 7 carbon atoms, R is hydrogen or an alkyl radical of 1 to about 7 carbon atoms and n is about 2 to 6.

9. The condensation reaction product of claim 3 wherein R" has 2 carbon atoms and R is hydrogen.

* * * * *